United States Patent [19]

Amoroso et al.

[11] Patent Number: 4,752,939
[45] Date of Patent: Jun. 21, 1988

[54] HIDDEN PREAMBLE FOR FREQUENCY HOPPED SYNCHRONIZATION

[75] Inventors: Frank Amoroso, Santa Ana; Norman L. Taylor, Rancho Palos Verdes, both of Calif.

[73] Assignee: Hughes Aircraft Company, Los Angeles, Calif.

[21] Appl. No.: 902,827

[22] Filed: Sep. 3, 1986

[51] Int. Cl.⁴ .......................... H04K 1/00; H04L 9/00
[52] U.S. Cl. .......................................... 375/1; 380/6; 380/34
[58] Field of Search .......................... 375/1; 380/6, 34

[56] References Cited

U.S. PATENT DOCUMENTS

| | | | |
|---|---|---|---|
| 4,188,580 | 2/1980 | Nicolai et al. | 380/6 |
| 4,267,592 | 5/1981 | Craiglow | 375/1 |
| 4,388,723 | 6/1983 | Keen | 375/1 |
| 4,561,089 | 12/1985 | Rouse et al. | 375/1 |
| 4,601,047 | 7/1986 | Horwitz et al. | 375/1 |
| 4,621,365 | 11/1986 | Chiu | 375/1 |

FOREIGN PATENT DOCUMENTS 2100944  1/1983  United Kingdom .

OTHER PUBLICATIONS

International Search Report.
National Telecommunications Conference, 27-29 Nov. 1979; IEEE, vol. 3, S. S. Rappaport et al., "A Two Level Coarse Code Acquisition Scheme for Spread Spectrum Radio".

*Primary Examiner*—Salvatore Cangialosi
*Attorney, Agent, or Firm*—A. W. Karambelas

[57] ABSTRACT

A method is provided for achieving initial synchronization of the transmission and reception of a frequency hopped communication signal, which comprises the steps of transmitting a preamble defined by a sequence of synchronizing pulses on a single channel and transmitting random dummy pulses over the remaining channels to hide the preamble. The received signal is filtered to obtain the preamble which is then convolved with a stored replica of the preamble to produce a synchronizing signal that is used to synchronize frequency hopping of the receiver and transmitter in preparation for the transmission of information. The received, constituent pulses of the preamble are delayed and accumulated by a baseband correlator (18) to form a composite pulse whose magnitude is detected by a threshold detector (20). The threshold detector produces the synchronizing signal (22) when the accumulated pulse reaches a prescribed value indicating that all of the bits of the preamble have been received.

13 Claims, 2 Drawing Sheets

HIDDEN PREAMBLE FOR FREQUENCY HOPPED SYNCHRONIZATION

BACKGROUND OF THE INVENTION

1. Field of the Invention

The present invention broadly relates to spread spectrum modulation, and especially frequency hopping techniques. More particularly, the invention relates to a method for synchronizing the operation of a transmitter and receiver in a frequency hopping communication system.

2. Description of the Related Art

Frequency hopping is often employed in communication systems in order to spread the signal spectrum so as to provide discrimination against energy-limited interference by using cross-correlation or matched-filter detectors. The interference may be natural (impulse noise), inadvertent (as in amateur radio or aircraft channels), or deliberate, where the jammer may transmit continuous or burst continuous wave, swept continuous wave, narrow-band noise, wide-band noise or replica or deception waveforms. Spread-spectrum systems such as frequency hopping occupy a signal bandwidth much larger than the information bandwidth. For example, in a frequency hopping system, if 100 channels are provided, each having a bandwidth of 300 Hz, the signal bandwidth or hop band is 30 KHz.

In connection with electronic counter measures (ECM), jamming techniques may be employed to interfere with or prevent receipt of the transmitted information. One technique of jamming consists of spreading the jam energy over the entire signal bandwidth. However, this results in the reduction of the jammer energy that can be allocated to each channel. Alternatively, the jammer may allocate all of the jam energy to a single channel. In this approach, the jammer becomes much more effective if he can synchronize his random hop generator with that of the transmitter. In order to achieve such synchronization, the jammer must know the hopping code of the transmitter or be prepared to follow the hopping pattern with great agility. The victim receiver must also know when the transmitter commences to send the hop pattern so that it can be synchronized with the pseudorandom hops of the transmitter. In order to achieve this synchronization, a hopped "preamble" is transmitted which is known in every detail to the victim receiver. The preamble is so elaborate in its details that it could not be mistaken by the victim receiver for any other information-bearing signal. In other words, the preamble is an unambiguous time marker which informs the receiver exactly when the message or information is going to commence. This preamble, however, is indistinguishable to the jammer from a typical information-bearing signal.

In the past, acquisition of initial synchronization to a frequency hopped preamble has been accomplished by one of two techniques. The first technique involves progressively slewing the receiver clock and attempting to correlate the local signal with the receiver clock and attempting to correlate the local signal with the received preamble. This slew-and-compare approach requires only a single RF-1F receiver processor, which is shifted in frequency by the local frequency synthesizer. The second approach to achieving synchronization involves convolving the received signal with a stored replica of the preamble (or some sufficiently long portion of it) and continuously testing for a peak of correlation. The convolving technique requires a bank of RF-1F processors, typically as many processors as there are different frequencies or channels involved in the preamble. The slew-and-compare approach requires a great deal longer to resolve a given time uncertainty at the receiver than the preamble convolver technique. For example, if the hop rate is R hops per second, the preamble consists of N pulses, and the time uncertainty at the receiver is T seconds, then the slew-and-compare technique requires a maximum of RT comparisons, each N/R seconds long, or NT seconds to resolve the uncertainty. In contrast, the convolving approach requires a maximum of only T seconds (plus the duration of the preamble itself, which is typically much less than T). For a large N, the contrast between the two techniques becomes quite significant and the choice between the two approaches requires a trade-off of speed versus complexity. Some applications, however, require a minimum of complexity but a faster processing time than is afforded by the slew-and-compare technique.

SUMMARY OF THE INVENTION

The present invention provides a method which lies intermediate the two prior art techniques described above, which possesses the essential simplicity of the slew-and-compare technique, and in most cases, the relatively fast speed of the preamble convolving technique.

In accordance with the present invention, in a frequency hopped radio frequency communication system of the type in which the transmitted signal includes a plurality of information pulses spread in a predefined pattern over a plurality of communication channels, a method of achieving initial synchronization of a transmitter with a receiver is provided. The method comprises the steps of transmitting a plurality of synchronization pulses defining a preamble on a single selected one of the communication channels, simultaneously transmitting a plurality of pulses respectively randomly distributed over the plurality of channels in order to hide the preamble, receiving the preamble on the selected channel at the receiver, comparing the received preamble with a reference replica of the preamble, and then, at the victim receiver, commencing to hop in synchronization with the received data-bearing signal when the received preamble matches the reference replica. The preamble marks the time of commencement of the transmission of the information pulses and preferably includes at least five characters or bits. The received signal is filtered to detect the selected channel and reject the remaining channels. The filtered signal is processed by a baseband correlator which functions to delay and accumulate the pulses according to the stored pattern that represents the preamble. The magnitude of the accumulated pulses is detected by a threshold detector. When the magnitude of the accumulated pulses reaches a preselected value, the threshold detector produces a synchronizing signal which marks the time of commencement of the information pulses.

DESCRIPTION OF THE PREFERRED EMBODIMENTS

Figure 1:
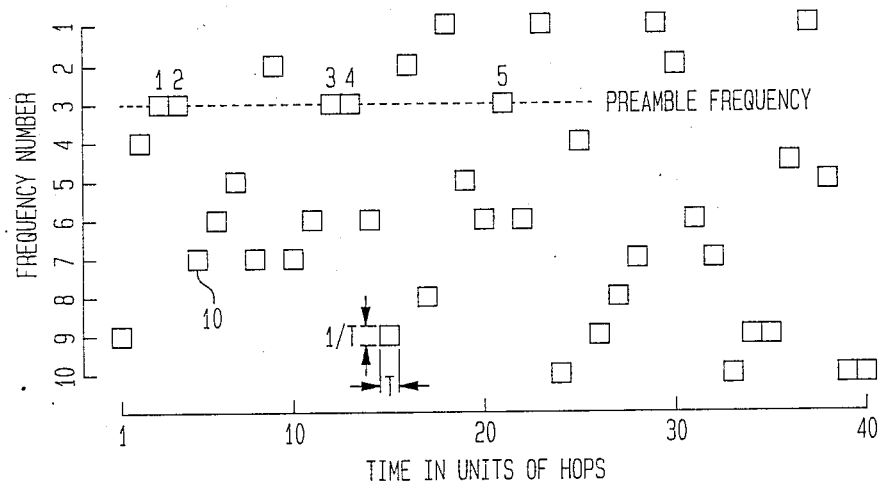
FIG. 1 is a time versus frequency plot of a ten channel frequency hopping system employing the hidden preamble according to the present invention.

Referring first to FIG. 1, the present invention involves a frequency hopping system in which a signal is transmitted over a spread frequency spectrum consisting of ten equiprobable frequencies or channels. The first forty "hops" are depicted, each hop being indicated by a square 10 and marking a frequency visit by the receiver and/or transmitter. Each hop 10 consists of a pulse whose content could be quite complex, containing one or more binary bits, and having a duration T. For simplicity in FIG. 1, the pulse structure is assumed simplest, having a bandwidth 1/T. A sequence of five pulses transmitted on a single channel, i.e. channel 3, defines the hidden preamble or timing signal which is employed to mark the time of commencement of the transmission of information pulses from a transmitter. The remaining pulses shown in the plot in FIG. 1 are randomly generated "dummies" which are employed to hide the preamble and thereby defeat attempts by the jammer to identify readily the preamble frequency and then jam it. The sequence, number and position of time of the pulses of the hidden preamble may seem random to a hostile interceptor but are known to the intended receiver. The number of bits employed for the hidden preamble should be sufficiently high, normally at least five, to avoid confusion of the preamble with random noise that normally reaches the receiver in advance of the preamble pulse. In the illustrated example, the five bit hidden preamble is transmitted in the time period of 21 hops.

Following the preamble and message which follows it, subsequent messages can be transmitted that are preceded by respectively associated preambles which are transmitted on different channels. In other words, the channel on which the preamble is transmitted can be changed each time a different message is sent.

Figure 2:
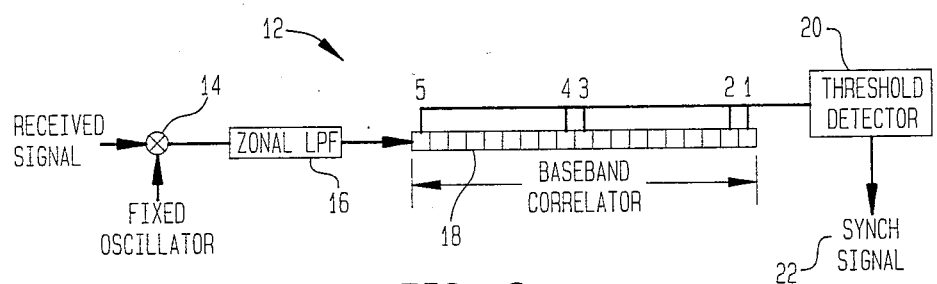
FIG. 2 is a block diagram of the receiver employed in the frequency-hopping system of the present invention to receive the hidden preamble.

Attention is now directed to FIG. 2 wherein the fundamental components of a receiver 12 are depicted which is intended to receive the hidden preamble and subsequent communication. The received signal including the hidden preamble is combined at 14 with a fixed (local) oscillator at the radio frequency of channel 3, and the resulting signal, which has been beaten down to baseband is passed through a low pass filter 16 which filters out all but 3 of the transmitted signal. The received pulse sequence on channel 3 is delivered to a baseband correlator 18, which may comprise, for example, a tapped delay line, which accumulates and delays the pulse in the hidden preamble, with pulse number 1 representing the longest delay time. The tap spacings of the tapped delay line reflect the time reversal of the sequence of preamble pulses. The net output of the baseband correlator is to deliver all pulses simultaneously in one single pulse to a threshold detector 20 which functions to measure the magnitude of such single pulse and outputs a synchronization signal 22 when the pulse is of a prescribed value. The synchronization signal 22 marks the commencement of the transmission of actual data from the transmitter, or conversely, the time of arrival of such transmission. In effect, the receiver functions to convolve received hidden preamble with a stored replica of such premble, and a resulting match between the two marks the time of commencement of the transmission of data from the transmitter.

As previously mentioned, the preamble pulses are accumulated within 21 hops in the present example. It may thus be appreciated that the mean time to accumulate N pulses on any preselected frequency is ten N hops if there are ten equiprobable frequencies. In FIG. 1, channel 1 is typical, having accumulated its first four pulses in about 40 hops. However, not all frequencies adhere to the mean. In fact, the statistical distribution of the number of hops to accumulate any specified number of pulses has considerable variance. It is probable that there are certain frequencies which will accumulate visits much sooner than others. Specifically, the mean time to the first accumulation of five visits on some channel has been determined by computer simulation to be 21 hops. In the present method, the receiver, knowing the pseudo-random hopping pattern in advance, can elect to listen on that channel which gives the shortest preamble duration for the required number of pulses.

Figure 3:
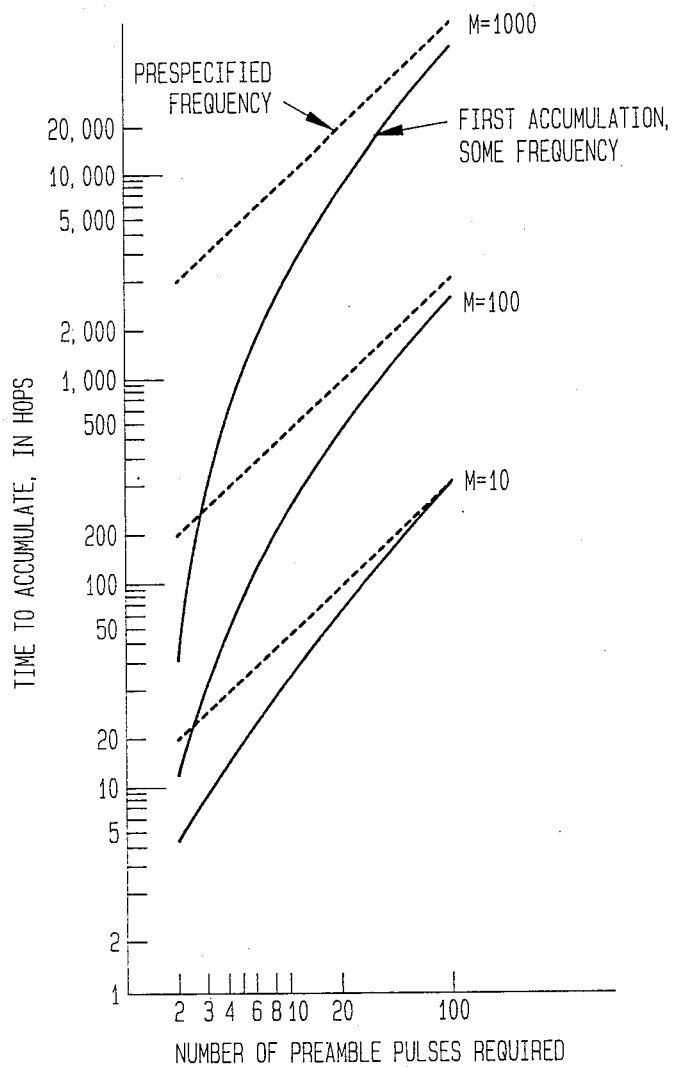
FIG. 3 is a plot depicting the mean times to accumulate specified numbers of pulses.

The means times to accumulate specified numbers of pulses are given in FIG. 3. Three cases are illustrated in FIG. 3, wherein the total number of hopping frequencies is M=10, 100 and 1000. The solid curves depict means time to first accumulation of the given number of pulses on some frequency. The dashed curves show mean time to accumulate the given number of pulses on a prespecified frequency. The formula for the dashed curves is NM. The solid curves were obtained by computer simulation, as the analytical problems associated with deriving them without simulation are known classically to be quite formidable.

As is apparent from FIG. 3, there is great advantage in relying on the statistics of first accumulation on some frequency. This advantage in relative terms is greatest for small numbers of required pulses in a system containing a large number of frequencies. For example, a four pulse preamble with M=1000 shows first accumulation in slightly less than 400 pulses, while the accumulation on a prespecified frequency takes 4,000 pulses. This advantage is considerably less with M=10. With 100 pulses required, the fractional advantage in using first accumulation is only marginal for all M considered.

It is to be noted that more than a single hidden preamble frequency or channel at a time can be employed when the reduction in preamble duration justifies the additional RF-1F processing components. The case of M=1,000 and N=4 previously mentioned assumes a much different character if two frequencies are used, with two pulses on each frequency. If the frequency follower jammer objective remains to jam half the preamble, then the jammer must identify both preamble frequencies on the basis of only one pulse on each frequency. If the jammer desires 50 percent probability of success, then to threshold the jammer would only require that there be a 50 percent probability of transmitting a dummy on the first pulse. This means that the preamble duration would only have to be slightly in excess of four hops, as opposed to the 400 hops in the single frequency illustration previously discussed. A receiver including two RF-1F processors would be required.

Having described the invention, it is recognized that those skilled in the art may make various modifications or additions to the preferred embodiment chosen to illustrate the invention without departing from the spirit and scope of the present contribution to the art. Accordingly, it is to be understood that the protection and to be afforded hereby should be deemed to extend to the subject matter claimed and all equivalents thereof fairly within the scope of the invention.

What is claimed is:

1. In a frequency hopped radio frequency communications system of the type in which the transmitted signal includes a plurality of information pulses which define at least a first message and are spread in a predefined pattern over a plurality of communication channels, a method of achieving initial synchronization of a transmitter with a receiver, comprising the steps of:
   (A) transmitting at least a first plurality of synchronization pulses defining at least a first preamble on a first single selected one of said communication channels, said first preamble marking the time of commencement of the transmission of said information pulses;
   (B) simultaneously with step (A), transmitting a plurality of dummy pulses respectively randomly distributed over said plurality of channels to hide said first preamble;
   (C) receiving said first preamble on said first selected channel at said receiver;
   (D) comparing the first preamble received in step (C) with a reference replica of said first preamble; and,
   (E) commencing transmission of said information pulses when the received first preamble matches the reference replica.

2. The method of claim 1, including the step of tuning said receiver to receive said single selected channel and to reject the pulses transmitted on the remaining ones of said channels.

3. The method of claim 1, wherein said preamble includes at least five of said synchronization pulses.

4. The method of claim 1, wherein step (C) is performed by filtering the signal received by said receiver to detect said selected channel and to reject the remaining channels.

5. The method of claim 1, wherein step (D) includes the step of delaying at least certain ones of said synchronization pulses and correlating each of said synchronization pulses with said reference replica.

6. The method of claim 1, including the steps of:
   (F) transmitting a second plurality of synchronization pulses defining a second preamble on a second single selected one of said communication channels which is different than said first channel;
   (G) simultaneously with step (F), transmitting a plurality of dummy pulses respectively randomly distributed over said plurality of channels to hide said second preamble;
   (H) receiving said second preamble on said second selected channel at said receiver;
   (I) comparing the second preamble received in step (H) with a reference replica of said second preamble; and
   (J) commencing transmission of information pulses defining a second message when the received second preamble matches the reference replica used in the comparison of step (I).

7. A method of synchronizing the transmission and reception of a radio frequency communications signal which includes a plurality of data pulses transmitted over a plurality of frequencies in a predefined pattern, comprising the steps of:
   (A) transmitting a timing signal indicating the time of commencement of the transmission of said communications signal, said timing signal including a sequence of data pulses all transmitted on a single one of said frequencies and marking said time of commencement;
   (B) simultaneously with step (A), transmitting a plurality of data pulses respectively randomly distributed over the remaining frequencies to hide the sequence of data pulses which mark said time of commencement;
   (C) tuning said receiver to receive said one frequency;
   (D) detecting the sequence of data bits received in step (C) which mark said time of commencement.

8. The method of claim 7, wherein said timing signal includes a sequence of at least five pulses.

9. The method of claim 7, wherein step (C) includes the step of filtering incoming signals to said receiver to separate said one frequency.

10. The method of claim 7, wherein step (D) includes the substep of delaying the pulses received in step (C) which mark said time of commencement and correlating the delayed pulses with a set of reference data.

11. The method of claim 7, wherein step (D) includes the substeps of convolving the pulses received in step (C) with a stored replica of said sequence pulses.

12. In a frequency hopped radio frequency communications system of the type in which the transmitted signal includes a plurality of information pulses which define at least a first message and are spread in a predefined pattern over a plurality of communication channels, a method of achieving initial synchronization of a transmitter with a receiver, comprising the steps of:
   (A) transmitting at least a first plurality of synchronization pulses defining at least a first preamble on a first single selected one of said communication channels, said first preamble marking the time of commencement of the transmission of said information pulses;
   (B) concurrently with step (A), transmitting a plurality of dummy pulses respectively frequency hopped over said plurality of channels to hide said first preamble;
   (C) receiving said first preamble on said first selected channel at said receiver;
   (D) comparing the first preamble received in step (C) with a reference replica of said first preamble; and,
   (E) commencing transmission of said information pulses when the received first preamble matches the reference replica.

13. The frequency hopped radio communication system of claim 12 wherein said synchronization pulses are separated by at least one time interval wherein one of said dummy pulses is transmitted.

* * * * *